United States Patent
Saiki

(10) Patent No.: US 7,929,859 B2
(45) Date of Patent: Apr. 19, 2011

(54) COIL SPRING STRUCTURE OF SHUTTER BUTTON CAMERA DEVICE AND BUTTON STRUCTURE OF ELECTRONIC DEVICE

(75) Inventor: Jun Saiki, Osaka (JP)

(73) Assignee: Panasonic Corporation, Osaka (JP)

( * ) Notice: Subject to any disclaimer, the term of this patent is extended or adjusted under 35 U.S.C. 154(b) by 334 days.

(21) Appl. No.: 11/952,928

(22) Filed: Dec. 7, 2007

(65) Prior Publication Data

US 2008/0138061 A1 Jun. 12, 2008

(30) Foreign Application Priority Data

Dec. 11, 2006 (JP) ................................ 2006-332993

(51) Int. Cl.
*G03B 17/00* (2006.01)
(52) U.S. Cl. ......... 396/543; 396/535; 267/168; 267/170
(58) Field of Classification Search .................. 396/543; 267/166.1, 167, 170, 174
See application file for complete search history.

(56) References Cited

U.S. PATENT DOCUMENTS

| | | | | |
|---|---|---|---|---|
| 5,503,375 A | * | 4/1996 | Balsells | 267/167 |
| 5,774,746 A | * | 6/1998 | Kirigaya et al. | 396/49 |
| 5,791,638 A | * | 8/1998 | Balsells | 267/167 |
| 5,878,998 A | * | 3/1999 | Hsieh | 267/166.1 |
| 6,088,531 A | * | 7/2000 | Endoh | 396/29 |
| 6,220,586 B1 | * | 4/2001 | Pavlin et al. | 267/155 |
| 6,466,747 B2 | * | 10/2002 | Tanaka | 396/543 |
| 6,880,989 B2 | * | 4/2005 | Sotome | 396/502 |
| 7,055,812 B2 | * | 6/2006 | Balsells | 267/167 |
| 7,090,521 B2 | * | 8/2006 | Nishio et al. | 439/248 |
| 7,309,357 B2 | * | 12/2007 | Kim | 623/17.13 |
| 2002/0071672 A1 | * | 6/2002 | Omiya | 396/348 |
| 2004/0169322 A1 | * | 9/2004 | Ogura et al. | 267/180 |
| 2005/0250976 A1 | * | 11/2005 | Melvin et al. | 600/16 |
| 2006/0022781 A1 | * | 2/2006 | Kim | 335/296 |
| 2008/0017255 A1 | * | 1/2008 | Petersen | 137/522 |
| 2009/0174510 A1 | * | 7/2009 | Kim | 335/222 |

FOREIGN PATENT DOCUMENTS

JP 2002-350943 12/2002

* cited by examiner

*Primary Examiner* — Clayton E Laballe
*Assistant Examiner* — Bret Adams
(74) *Attorney, Agent, or Firm* — Dickinson Wright PLLC

(57) ABSTRACT

In a camera device 1*a* with a shutter button 2 for transmitting an externally-applied pressing force to a switch 7, a boss 24 has a first end attached to the shutter button 2, and a second end opposed to the switch 7, a coil spring 6*a* has a first winding portion 61*a* and a second winding portion 62*a*, which are respectively wound into first and second shapes about a common central axis As, the second shape includes the first winding portion 61*a*, and the second end of the boss 24 is inserted into the first winding portion 61*a*.

14 Claims, 11 Drawing Sheets

COIL SPRING STRUCTURE OF SHUTTER BUTTON CAMERA DEVICE AND BUTTON STRUCTURE OF ELECTRONIC DEVICE

FIELD OF THE INVENTION

The present invention relates to camera devices with a spring-biased shutter button.

BACKGROUND OF THE INVENTION

Recent years have seen the increasing popularity of digital cameras among other camera devices, and the number of digital cameras produced is increasing yearly. In general, the digital cameras are roughly classified into single-lens reflex type and compact type. Recently, the digital cameras of the single-lens reflex type are increasingly being shipped, but as for the digital cameras of the compact type, small and slim digital cameras are also still popular. To achieve such size and thickness reduction of the cameras, Japanese Laid-Open Patent Publication No. 2002-350943 proposes technology for improving, for example, the structure of a battery chamber with battery connectors directly attached to a switch.

While the size and the thickness are being reduced, the number of functions tends to be increased, so that technology for internal circuits, etc., is becoming complicated and advanced. To meet the demands to reduce the device size and thickness, and increase the circuit scale under such circumstances, it is necessary to deal with such problems as more efficient packaging of internal parts, and reduction in number of man-hours spent for part integration. In particular, for small movable parts, such as a shutter button, it is necessary to achieve simple and reliable assembly work.

FIG. 11 illustrates the cross-sectional configuration of a conventional switch pressing mechanism intended for size and thickness reduction, in which a shutter button is biased by a coil spring, rather than by a leaf switch. The switch pressing mechanism RSp includes a shutter button 2, a guide member 4, a guide member 5, and a coil spring 6p.

The guide member 4 is composed of a cylindrical portion, and a ring portion, which is provided in such a manner as to be substantially perpendicular to the cylindrical portion and extend toward the central axis of the switch pressing mechanism RSp. In addition, the guide member 4 is attached at the ring portion to an upper circumferential surface of an opening portion 31 provided in a portion of a housing 3 of a digital camera 1p.

The shutter button 2 includes a disk-shaped portion 21, and an outer ring portion 22 extending around the disk-shaped portion 21. Note that the outer ring portion 22 has a step portion 23 provided at its outer circumference. The shutter button 2 is formed, such that the diameter of the outer circumference, including the step portion 23, is greater than the inner diameter of the ring portion of the guide member 4, and smaller than the inner diameter of the cylindrical portion. The shutter button 2 has a columnar boss 24 at the center of its back side, the columnar boss 24 being defined with an outer diameter D24 smaller than a diameter D51 of a hole 51 provided at the center of the guide member 5.

The guide member 5 is provided in the shape of a disk having a flat portion 52. The guide member 5 has the hole 51 provided at the center, the hole 51 being defined with the diameter D51 greater than the outer diameter D24 of the boss 24. The guide member 5 is attached at the upper surface of its outer circumference to a lower circumferential surface of the opening portion 31. Note that a switch 7, which is attached to a circuit board 8, is disposed below the guide member 5 so as to be opposed to the hole 51.

The coil spring 6p is defined with a diameter D6 smaller than the inner diameter of the shutter button 2, and greater than the diameter D51 of the hole 51. Note that the diameter D6 of the coil spring 6p is a mean diameter between the outer diameter and the inner diameter. Although not shown in the figure due to limitations of space, the outer and inner diameters of the coil spring 6p are denoted by D6o and D6i, respectively.

The shutter button 2 is fitted in the guide members 4 and 5, with the boss 24 being inserted into the inner circumferential portion of the coil spring 6p. Concretely, the shutter button 2 is engaged with the guide member 4, such that the outer circumference of the disk-shaped portion 21 is placed at a predetermined clearance from the inner circumference of the ring portion of the guide member 4. The step portion 23 is in contact with the bottom surface of the ring portion, so that the coil spring 6p is compressed between the bottom surface of the guide member 4 and the top surface of the guide member 5, biasing the shutter button 2 by a predetermined force toward the direction opposite to the direction indicated by arrow Y (hereinafter, referred to as the "direction Y"). That is, the shutter button 2 is held with the top surface of the step portion 23 being in contact with the bottom surface of the ring portion. As a result, the shutter button 2 is held so as not to slip off.

In the switch pressing mechanism RSp thus configured, the shutter button 2 is pressed in the direction Y by a human finger or suchlike, so that the boss 24 moves in the direction Y to touch the switch 7, while resisting the biasing force of the coil spring 6p. In general, a two-step click switch is used as the switch 7, and therefore by pressing the shutter button 2 consecutively, the state of the switch 7 sequentially changes to "half-pressed" and then to "completely-pressed".

As described above, pressing the shutter button of the digital camera is a two-step operation: "start of pressing" to "half-pressing"; and "half-pressing" to "complete pressing". By "half-pressing", focusing is performed, and exposure conditions, such as shutter speed and aperture, are determined. Whereas, by "complete pressing", shooting is executed.

Subtle control of force is required to operate the shutter button 2. Specifically, the shutter button 2 has to be smoothly pressed during the entire stroke from the "start of pressing" to the "complete pressing". Accordingly, the coil spring 6p for biasing the shutter button 2 is required to apply a small and stable repulsive force during the entire stroke of the shutter button 2. Therefore, the coil spring 6p is normally formed by a spring material with a small wire diameter and a large winding diameter.

To achieve the small and stable repulsive force during the entire stroke of the shutter button 2, it is necessary to bring the coil spring 6p into uniform contact with both the guide members 4 and 5. To this end, the coil spring 6p must be aligned with the boss 24, i.e., the central axis of the coil spring 6p coincides with the central axis of the boss 24.

However, as the shutter button 2 is pressed repeatedly, the coil spring 6p might be displaced in the diameter direction of the shutter button 2 as shown in FIG. 11. When the coil spring 6p is displaced, it cannot be in uniform contact with both the guide members 4 and 5, so that the pressing force is biased and the shutter button 2 cannot be smoothly pressed.

In addition, the diameter D6 of the coil spring 6p is large as compared to the outer diameter D24 of the boss 24, and therefore the coil spring 6p is, for example, displaced or inclined in the diameter direction of the shutter button 2 during integration of the shutter button 2 into the housing 3, so that the integration is carried out with the coil spring 6p being stuck on the boss 24 or a guiding boss 25, for example. In such a case, the shutter button 2 cannot be properly pressed or returned. Therefore, assembling the switch pressing mechanism RSp and integrating it into the digital camera 1a are difficult tasks that require extreme caution.

BRIEF SUMMARY OF THE INVENTION

A first objective of the present invention is to provide a camera device with a shutter button that can be smoothly pressed. In addition, a second objective of the present invention is to provide a camera device with a shutter button that can be assembled in a simple and reliable manner.

To achieve the above objectives, the present invention provides a camera device with a shutter button for transmitting an externally-applied pressing force to a switch, the device comprising:

a coil spring with a first winding portion and a second winding portions the first winding portion being wound into a first shape about a central axis, the second winding portion being wound into a second shape about the central axis so as to include the first winding portion, wherein, the shutter button has a boss portion opposed to the switch and inserted into the first winding portion.

The present invention makes it possible to achieve smooth pressing of the shutter button, as well as to allow workers, no matter who they are, to always position the coil spring at the center of the shutter button.

The first winding portion is preferably provided so as to continue from one end of the second winding portion. By inserting the boss portion into the first winding portion during assembly of a switch pressing mechanism, it becomes possible to readily and reliably attach the coil spring to the shutter button.

In addition, the coil spring may further include a third winding portion wound into a third shape about the central axis, the third shape being included in the second winding portion. By providing the first and third winding portions at opposite ends of the coil spring, it becomes possible to more reliably fit the coil spring on the boss portion as compared to the case where the coil spring includes only the first winding portion. In addition, it is possible to eliminate the necessity of checking the end portion of the coil spring to confirm whether the coil spring has been fitted from the appropriate end during assembly work, resulting in improvement in workability.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 11 is a view illustrating in cross section a substantial portion of a switch pressing mechanism of a conventional digital camera.

DETAILED DESCRIPTION OF THE INVENTION

Figure 1:
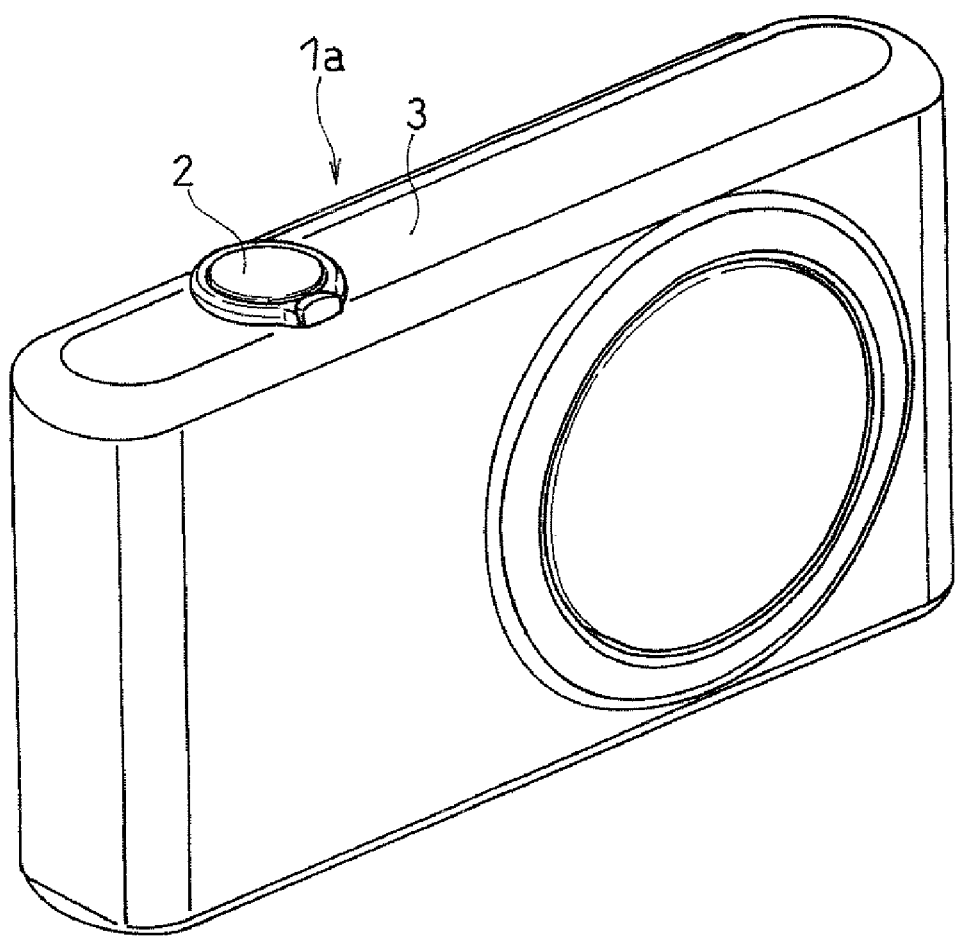
FIG. 1 is a perspective view illustrating the appearance of a digital camera according to an embodiment of the present invention.

Before describing an embodiment of the present invention in detail with reference to the drawings, a switch pressing mechanism of a camera device according to the present invention will be described in terms of its technical features. The above-described problems pertinent to conventional switch pressing mechanisms are considered to be due to the coil spring moving in the diameter direction of the boss. Therefore, the present invention additionally provides means for aligning the coil spring with the boss in the diameter direction without compromising the size and thickness reduction of the switch pressing mechanism, thereby making it possible to achieve smooth pressing of the switch.

Concretely, unlike the conventional coil spring 6p, a coil spring 6 according to the present invention is basically defined with at least two diameters D1 and D2 that satisfy the following equations (1) and (2).

$$D1 < D2 \tag{1}$$

$$D1 \approx D24 \tag{2}$$

For convenience of explanation, a portion of the coil spring 6 that has the diameter D1 is referred to as a "small diameter portion 61", and a portion with the diameter D2 is referred to as a "large diameter portion 62". The above equation (2) shows that the diameter D1 (more precisely, "inner diameter D1$i$") of the small diameter portion 61 is almost equal to the outer diameter D24 of the boss 24, i.e., D1 (D1$i$)=D24±ΔD. Note that the clearance ΔD is a value arbitrarily set in consideration of the diameter D24, elasticity of the coil spring 6, etc.

The diameter D2 (more precisely, "outer diameter D2$o$") of the large diameter portion 62 is smaller than the inner diameter of the shutter button 2. Specifically, the coil spring 6 can be designed in such a size as not to touch the outer ring portion 22 of the shutter button 2. Here, it is taken into consideration that a larger seating surface of the coil spring 6 ensures a more stable posture during attachment to the shutter button 2. In addition, the wire diameter of the coil spring 6 is calculated in accordance with service life, load capacity, and stroke length.

Hereinafter, the embodiment will be described with reference to the drawings by taking the digital camera as an example of the camera device.

As shown in FIG. 1, a shutter button 2 included in a switch pressing mechanism RS (not shown) is disposed at the top of a housing 3 of the digital camera 1a according to the present embodiment. The switch pressing mechanism RS according to the present invention is configured basically in the same manner as the above-described conventional switch pressing mechanism RSp, except for the coil spring 6 (not shown), and therefore the following description will focus on the coil spring 6.

Figure 2:
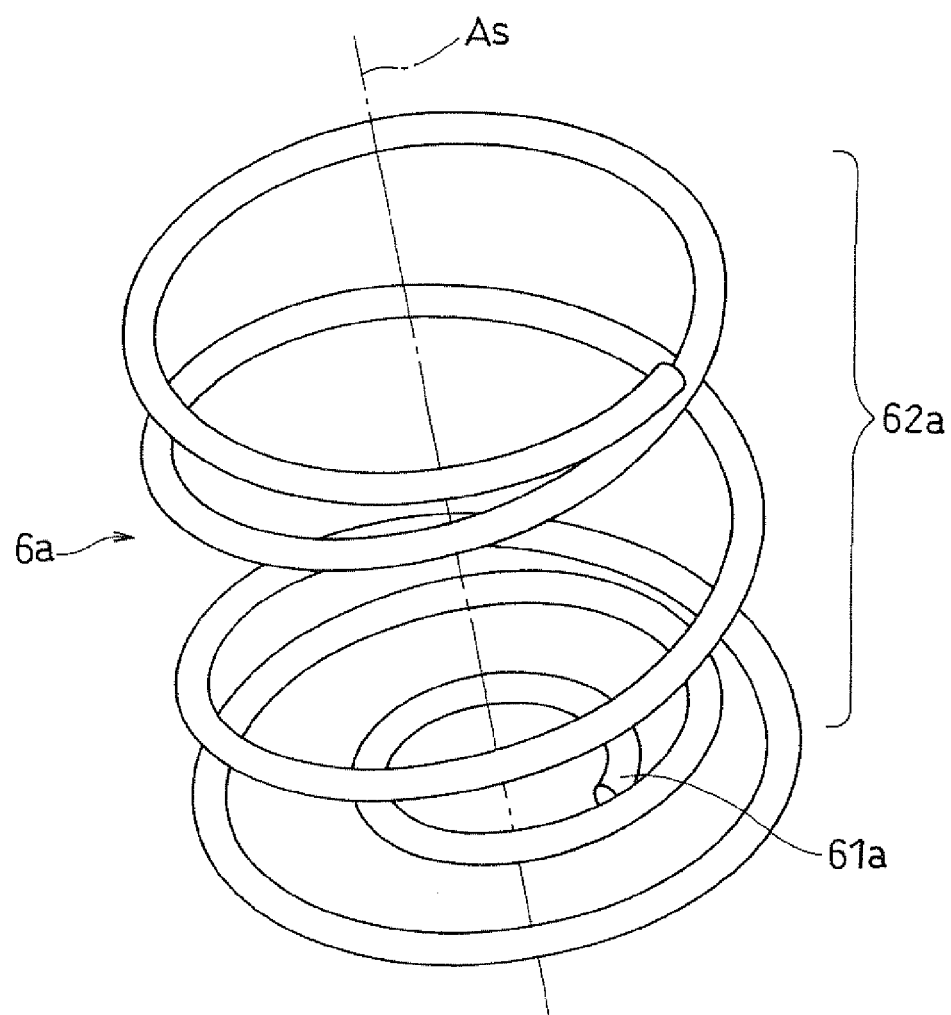
FIG. 2 is a perspective view illustrating a coil spring used in the embodiment of the present invention.

FIG. 2 illustrates a coil spring 6a according to the present embodiment. The coil spring 6a includes a large diameter portion 62a with a large winding diameter D2, which is formed by a series of spiral windings concentric with respect to a central axis As, and a small diameter portion 61a with a small winding diameter D1, which is formed by being wound about the same central axis As. Basically, most of the coil spring 6a is constituted by the large diameter portion 62a, and the small diameter portion 61a is formed in continuation from an end of the large diameter portion 62a. Note that the small diameter portion 61a is preferably configured to be positioned roughly in the same plane as the winding of the diameter portion 62a that is connected thereto.

Figure 3:
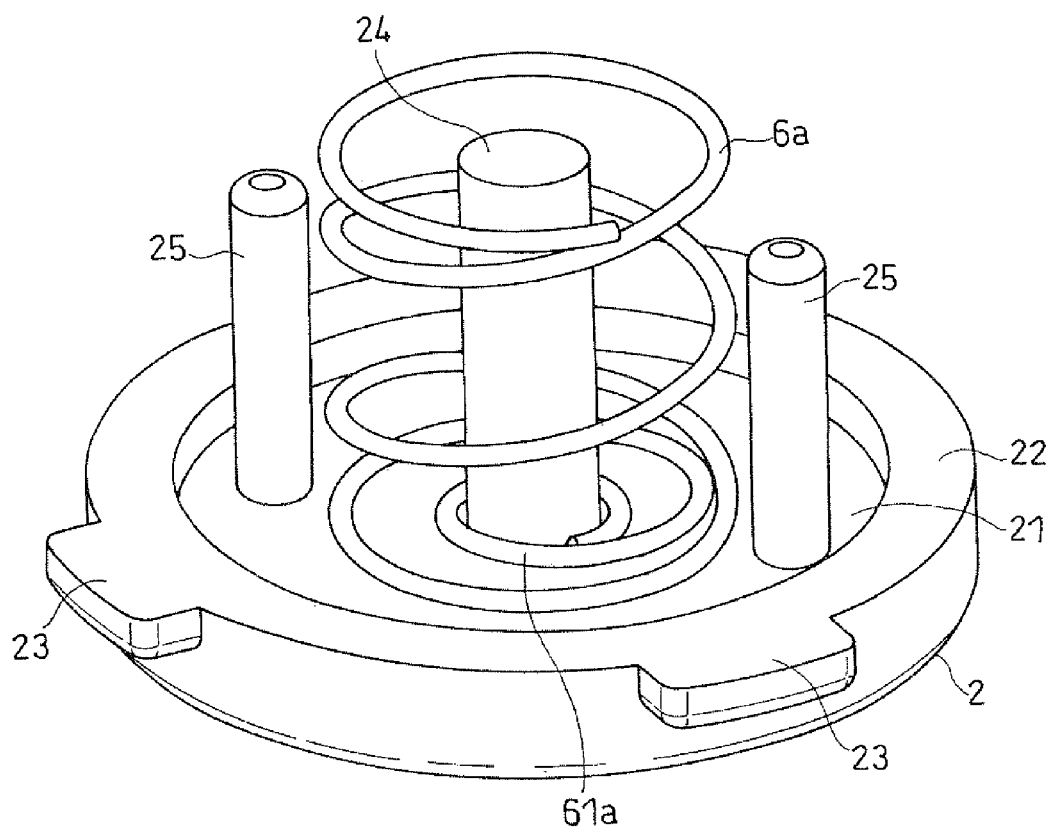
FIG. 3 is a perspective view illustrating a shutter button viewed from the bottom before integration into the digital camera.

FIG. 3 illustrates the switch pressing mechanism RS with the shutter button 2 viewed from the bottom before integration into the digital camera 1 (the housing 3). The coil spring 6a is fitted on the boss 24 of the shutter button 2 by inserting the boss 24 from the small diameter portion 61a. Specifically, when the boss 24 is inserted, the diameter portion 61a of the coil spring 6a is brought into contact with the bottom face of a disk-shaped portion 21.

Note that in the present example, two guiding bosses 25 are provided on the disk-shaped portion 21 so as to be positioned opposite to each other around the coil spring 6a. The guiding bosses 25 are inserted into guiding holes (not shown) formed in a guide member 5. It is understood that, in this case, the winding diameter D2 of the coil spring 6a is determined so as not to bring the coil spring 6a into contact with the guiding bosses 25. As for the guiding bosses 25, it is preferable that a plurality of such bosses are equiangularly provided around the boss 24 in order to achieve smooth pressing of the shutter button 2. However, the guiding bosses 25 are dispensable for the configuration of the switch pressing mechanism RS according to the present invention.

Figure 4:
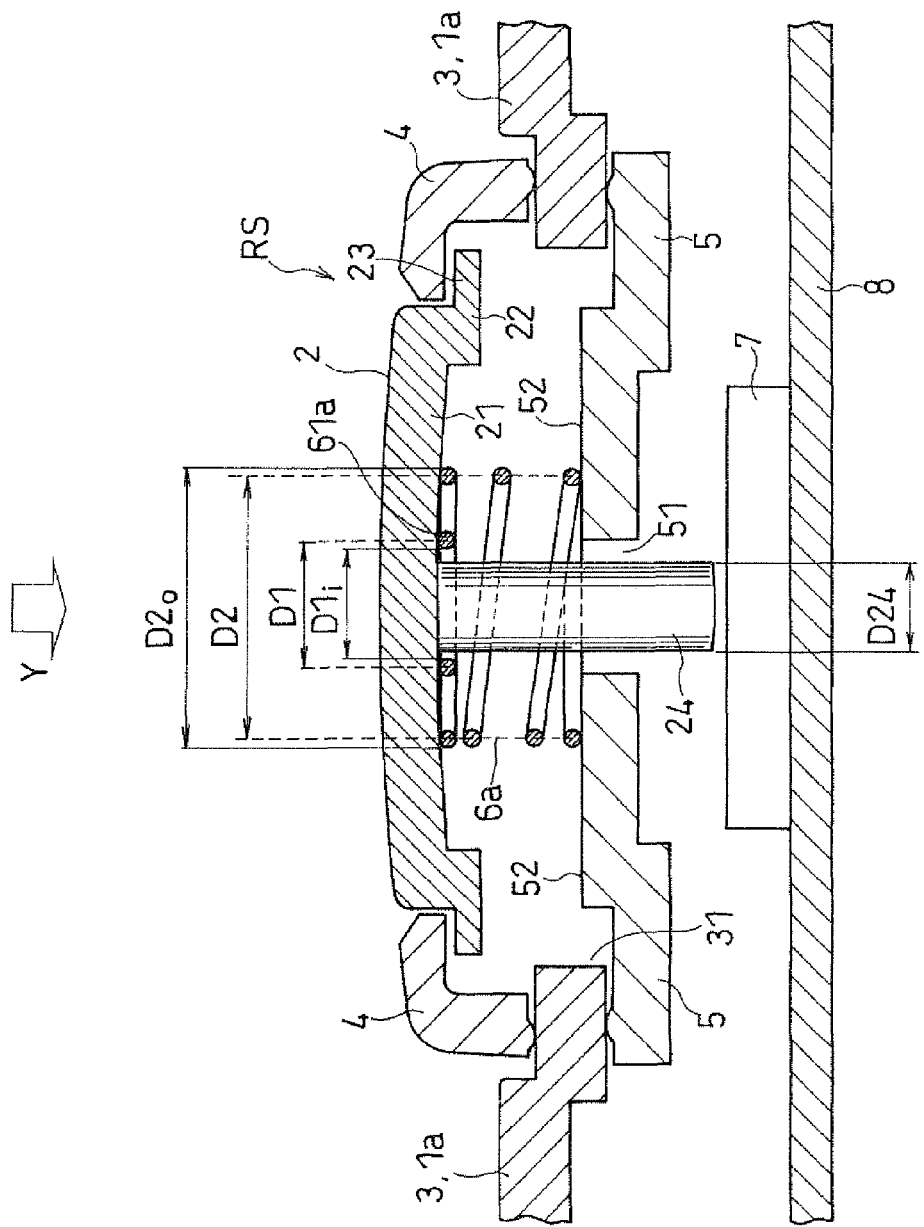
FIG. 4 is a view illustrating in cross section a substantial portion of a switch pressing mechanism of the digital camera in FIG. 1.

FIG. 4 illustrates in cross section a substantial portion of the above-described switch pressing mechanism RS having the shutter button 2 and the coil spring 6a incorporated therein. In FIG. 4, elements having the same functions as those of the elements shown in FIG. 11 are denoted by the same reference numerals, and descriptions thereof will be omitted herein. In addition, the above-described guiding bosses 25 are not shown because they are dispensable. As described above, the coil spring 6a is fitted on the boss 24, with the small diameter portion 61a having a predetermined clearance ($\Delta D$) from the boss 24, so that the position of the large diameter portion 62a is fixed in the radial direction perpendicular to the direction Y, which is parallel to the central axis As of the coil spring 6a, and the coil spring 6a is prevented from being displaced with respect to the disk-shaped portion 21 (the shutter button 2) and a flat portion 52 (the guide member 5).

To describe it specifically, as described above, the coil spring 6a requires a small and stable repulsive force during the entire stroke of the shutter button 2, and therefore the coil spring 6a is formed by a spring material with a small wire diameter and a large winding diameter. The winding diameter of the large diameter portion 62a is constant in the length direction of the coil spring 6a, and the small diameter portion 61a provided at one end of the coil spring 6a has an inner diameter D1$i$ slightly greater than the outer diameter D24 of the boss 24. In this case, the large diameter portion 62a and the small diameter portion 61a form concentric circles roughly on the same plane at one end of the coil spring 6a, and therefore the coil spring 6a is always centrally positioned on the bottom surface of the disk-shaped portion 21. Thus, it is possible to ensure a reliable assembly process, which prevents the coil spring 6a from falling, and erroneous assembly.

The large diameter portion 62a with a larger winding diameter, which is a cylindrical portion of the coil spring 6a that is constituted by a plurality of windings made up of a thin wire, plays the role of applying a stable repulsive force. In addition, the small diameter portion 61a and the winding of the large diameter portion 62a that continues therefrom are positioned roughly on the same plane, and therefore when the coil spring 6a is incorporated as a part of the switch pressing mechanism RS, the coil spring 6a can be in contact at the small diameter portion 61a and the large diameter portion 62a with the disk-shaped portion 21 of the shutter button 2. Specifically, when compared to the case where only the small diameter portion 61a is in contact with the disk-shaped portion 21, a wider seating portion can be in uniform contact with the disk-shaped portion 21, making it possible to ensure a stable posture during attachment to the shutter button 2.

However, the small diameter portion 61a does not always have to be positioned on the same plane as the winding of the large diameter portion 62a that continues therefrom. The small diameter portion 61a can be provided proximal to the shutter button 2, e.g., the small diameter portion 61a can be positioned inwardly from (i.e., closer to the end opposite to) the winding of the large diameter portion 62a that continues therefrom, so that only the large diameter portion 62a is in contact with the disk-shaped portion 21. In addition, depending on the elasticity of the coil spring 6a, it is allowable that the small diameter portion 61a is displaced from the large diameter portion 62a continued therefrom in the direction parallel to the central axis As.

With the above configuration, the shutter button 2 of the digital camera 1a according to the present embodiment can resist a stable biasing force of the coil spring 6a in the direction opposite to the direction Y, thereby making it possible to stably and smoothly press the switch 7 via the boss 24. In addition, by fitting the small diameter portion 61a on the boss 24 during assembly of the switch pressing mechanism RS, it becomes possible to readily and reliably attach the coil spring 6a to the shutter button 2. Furthermore, the shutter button 2 having the coil spring 6a reliably attached thereto can be readily incorporated into the switch pressing mechanism RS.

Note that in the present embodiment, the inner diameter D1$i$ of the small diameter portion 61a is slightly greater than the outer diameter D24 of the boss 24, but it may be roughly equal to or slightly smaller than the outer diameter D24. In such a case, it is possible to further improve the alignment function of the small diameter portion 61a.

(First Variant)

Figure 5:
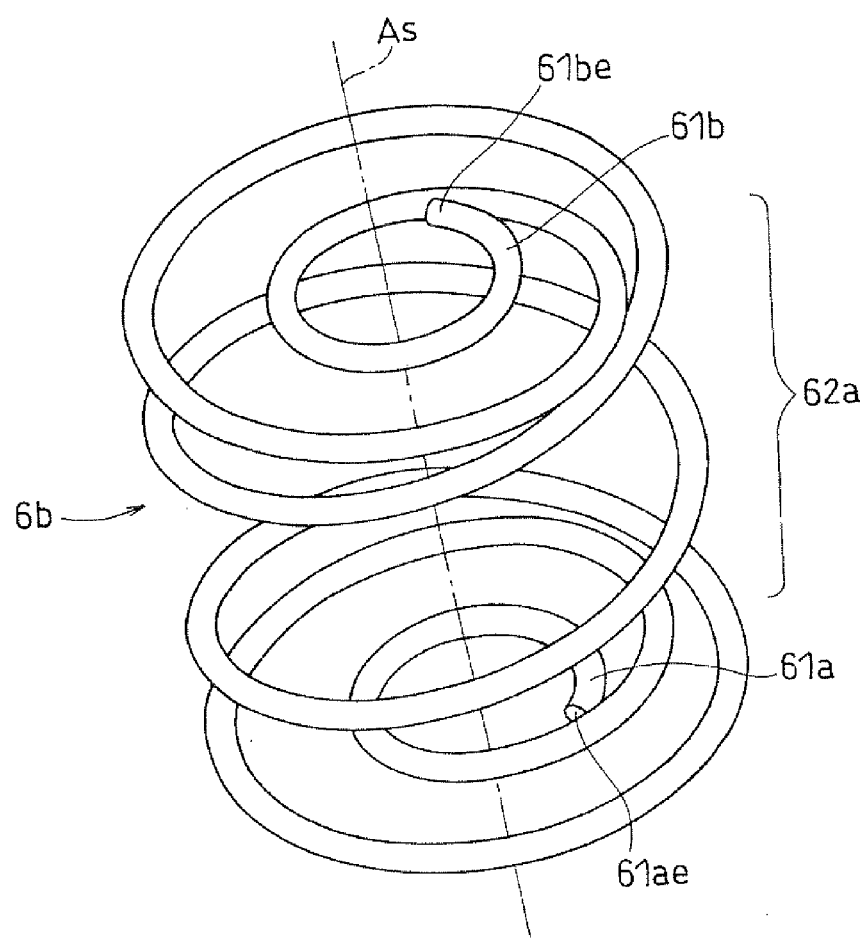
FIG. 5 is a perspective view illustrating a variant of the coil spring.

Hereinafter, a first variant of the coil spring 6a according to the present invention will be described with reference to FIGS. 5 and 6. As shown in FIG. 5, a coil spring 6b according to the present variant has the small diameter portion 61a provided at one end of the large diameter portion 62a as in the coil spring 6a shown in FIG. 3. Furthermore, the coil spring 6b has a small diameter portion 61b provided at the other end of the large diameter portion 62a. Although it is preferable that the small diameter portion 61b is substantially equivalent to the small diameter portion 61a, it is understood that a slight difference is allowable.

Figure 6:
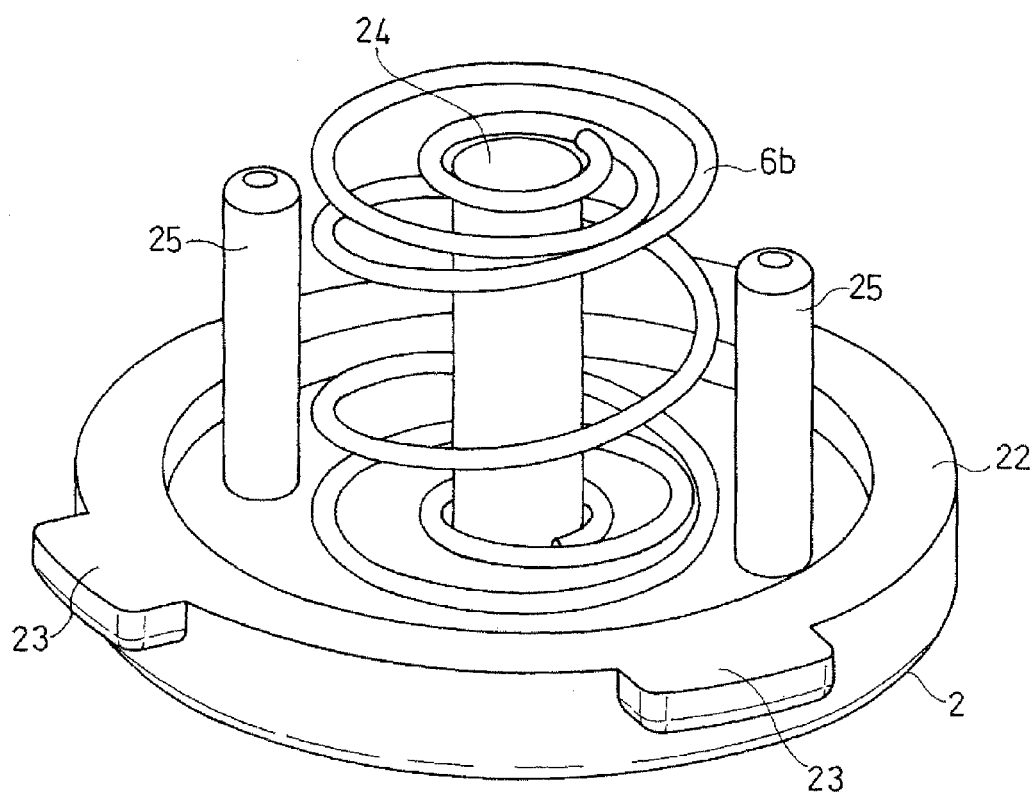
FIG. 6 is a perspective view illustrating a shutter button with the coil spring in FIG. 5 viewed from the bottom.

FIG. 6 illustrates the coil spring 6b fitted on the boss 24 in the same manner as in FIG. 3. The small diameter portions 61a and 61b provided at opposite ends of the coil spring 6b make it possible to fit the coil spring 6b on the boss 24 more reliably than the coil spring 6a is fitted. In addition, by providing the small diameter portions 61a and 61b at the opposite ends of the coil spring 6b, it becomes possible to eliminate the necessity of checking the end portion of the coil spring to confirm whether the coil spring has been fitted from the appropriate end during assembly work, resulting in further improvement in workability.

Note that in view of the influence of gaps between the boss 24 and the ends of the coil spring 6 on movement of the coil spring 6b in the radial direction, it is preferable that, as shown in FIG. 5, a winding end portion 61ae of the small diameter portion 61a and a winding end portion 61be of the small diameter portion 61b are not positioned so as to overlap with each other in the same diameter direction of the boss 24, i.e., a line extending between the winding end portion 61ae and the central axis As of the boss 24 make an angle with a line extending between the winding end portion 61be and the central axis As. However, the positions of the winding end portions 61ae and 61be are not limited.

(Second Variant)

Figure 7:
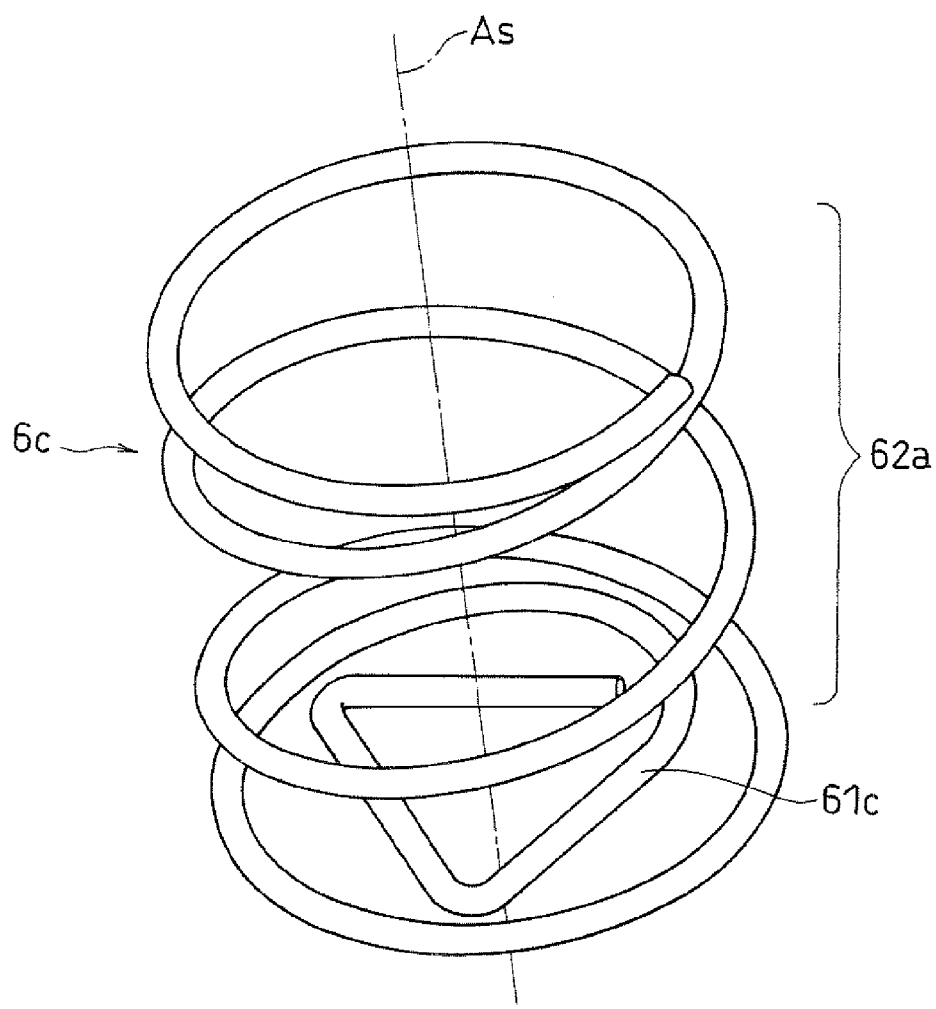
FIG. 7 is a perspective view illustrating another variant of the coil spring.

Hereinafter, a second variant of the coil spring 6a according to the present invention will be described with reference to FIGS. 7 and 8. As shown in FIG. 7, a coil spring 6c according to the present variant has a small diameter portion 61c provided at one end of the large diameter portion 62a as in the coil spring 6a shown in FIG. 3. However, the coil spring 6c differs from the coil spring 6a, which has the small diameter portion 61a in the form of a spiral winding, in that the small diameter portion 61c is provided in the form of a polygon (in the present example, a triangle). The small diameter portion 61c is preferably in the form of a regular polygon, and the following description will be given based on such a premise, but it is understood that the regular polygon is not intended to be limiting.

The small diameter portion 61c is formed, such that the inscribed circle diameter of the polygon is equal to the inner diameter D1i of the small diameter portion 61a, and the circumscribed circle diameter of the polygon is smaller than the outer diameter D2o of the large diameter portion 62a. Therefore, the small diameter portion 61c and the large diameter portion 62a do not overlap with each other. In addition, as in the case of the above-described large diameter portion 62a, the winding axis of the small diameter portion 61c is roughly equal to the central winding axis of the large diameter portion 62a. The coil spring 6c is the same as the coil spring 6a in other respects. Note that when the small diameter portion 61c is not a regular polygon, the inscribed circle refers to the smallest circle enclosed in the small diameter portion 61c, and the circumscribed circle refers to the smallest circle enclosing the small diameter portion 61c.

Figure 8:
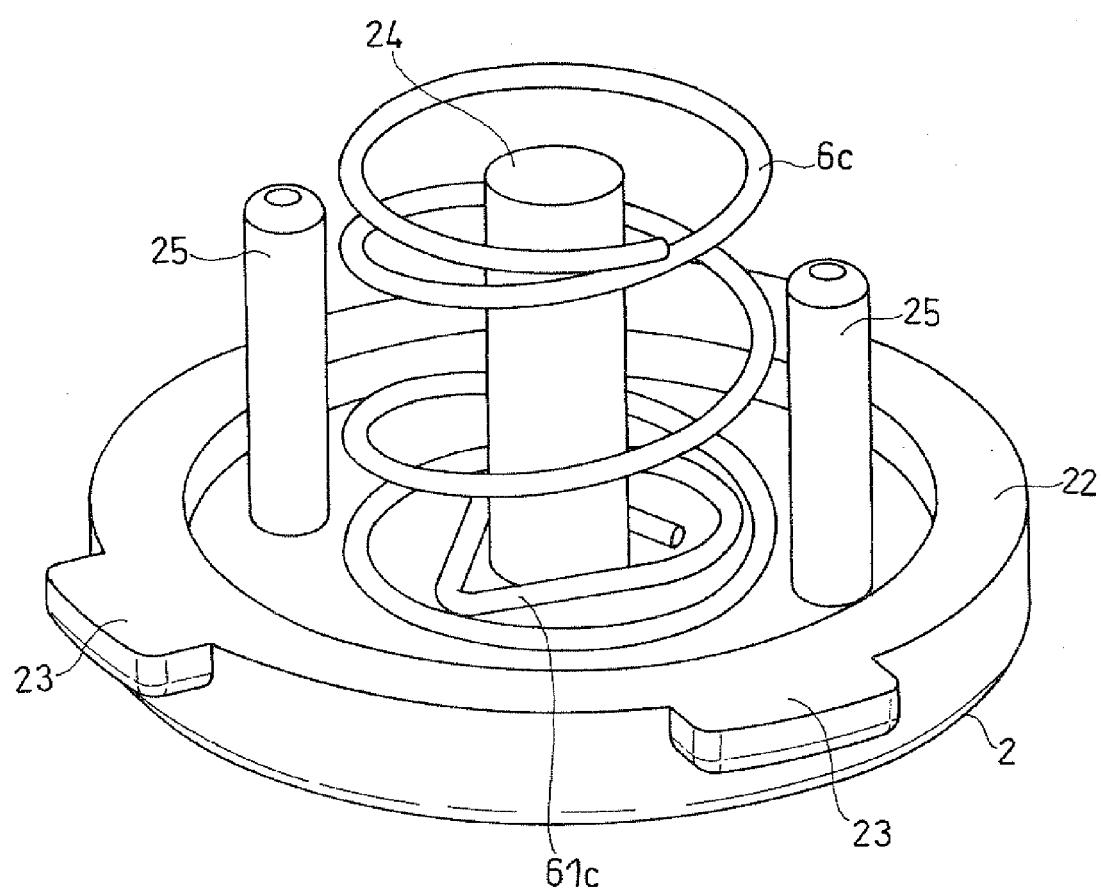
FIG. 8 is a perspective view illustrating a shutter button with the coil spring in FIG. 7 viewed from the bottom.

FIG. 8 illustrates the coil spring 6c fitted on the boss 24 in the same manner as in FIG. 3. As shown, the coil spring 6c is fitted on the boss 24 by the small diameter portion 61c provided at one end of the large diameter portion 62a in the same manner as by the small diameter portion 61a of the coil spring 6a.

(Third Variant)

Figure 9:
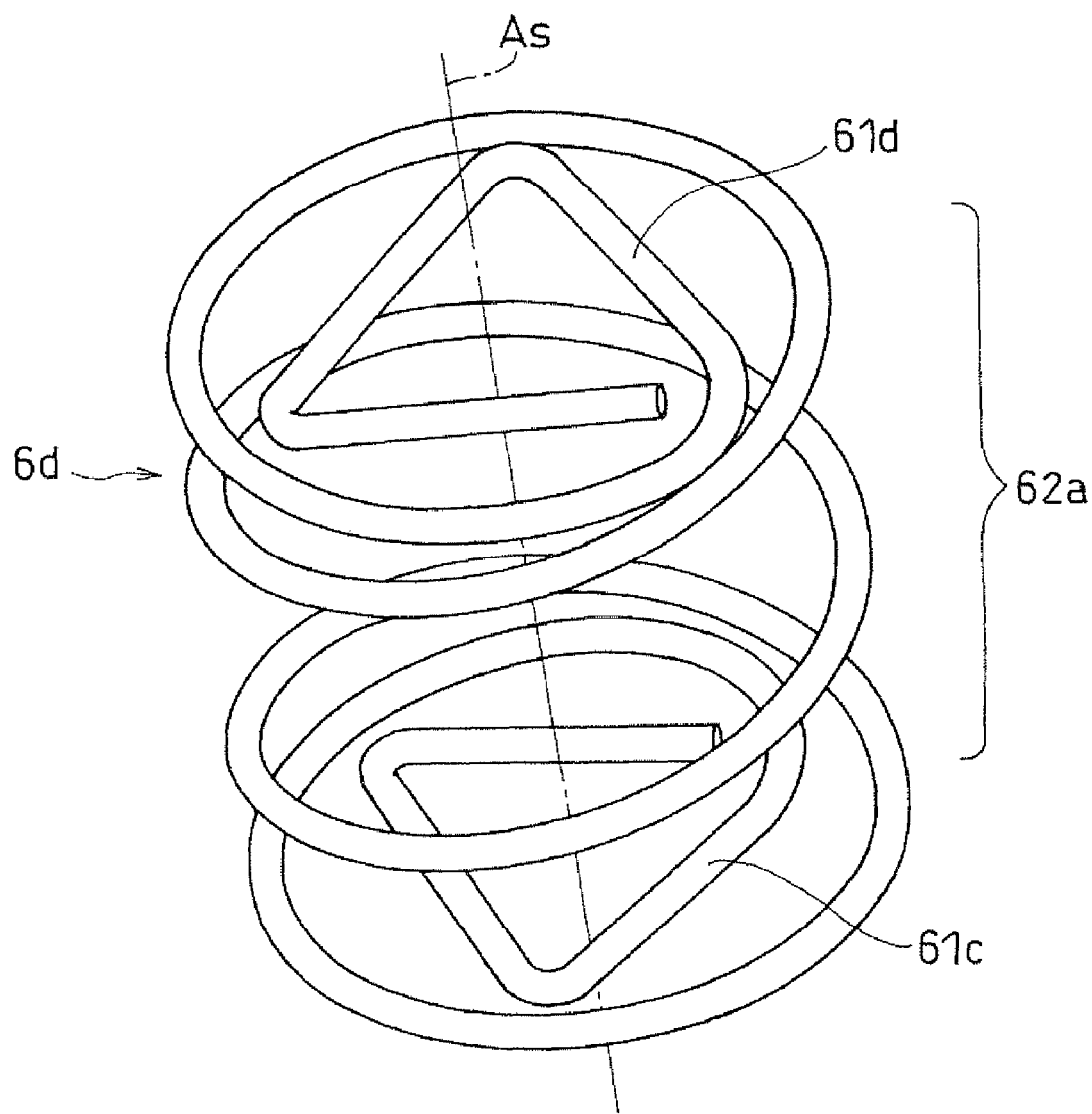
FIG. 9 is a perspective view illustrating still another variant of the coil spring.

Hereinafter, a third variant of the coil spring 6a according to the present invention will be described with reference to FIGS. 9 and 10. As shown in FIG. 9, a coil spring 6d according to the present variant has the small diameter portion 61c provided at one end of the large diameter portion 62a as in the coil spring 6c shown in FIG. 7. Furthermore, the coil spring 6d has a small diameter portion 61d provided at the other end of the large diameter portion 62a. Although it is preferable that the small diameter portion 61d is substantially equivalent to the small diameter portion 61c, it is understood that a slight difference is allowable.

Figure 10:
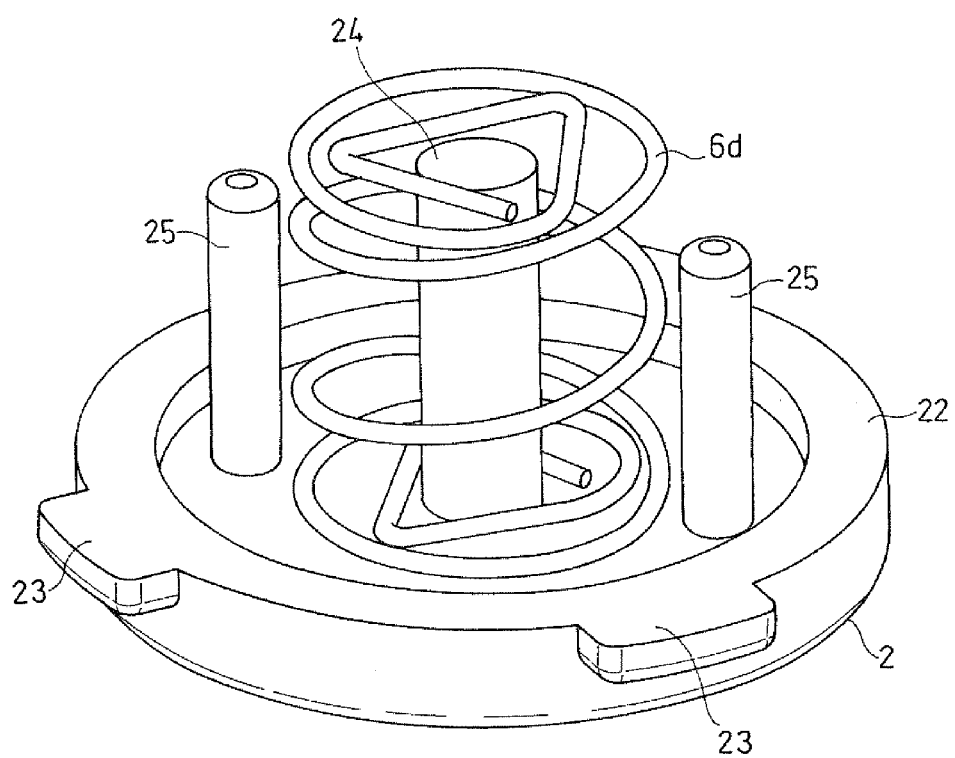
FIG. 10 is a perspective view illustrating a shutter button with the coil spring in FIG. 9 viewed from the bottom.
Figure 1F:
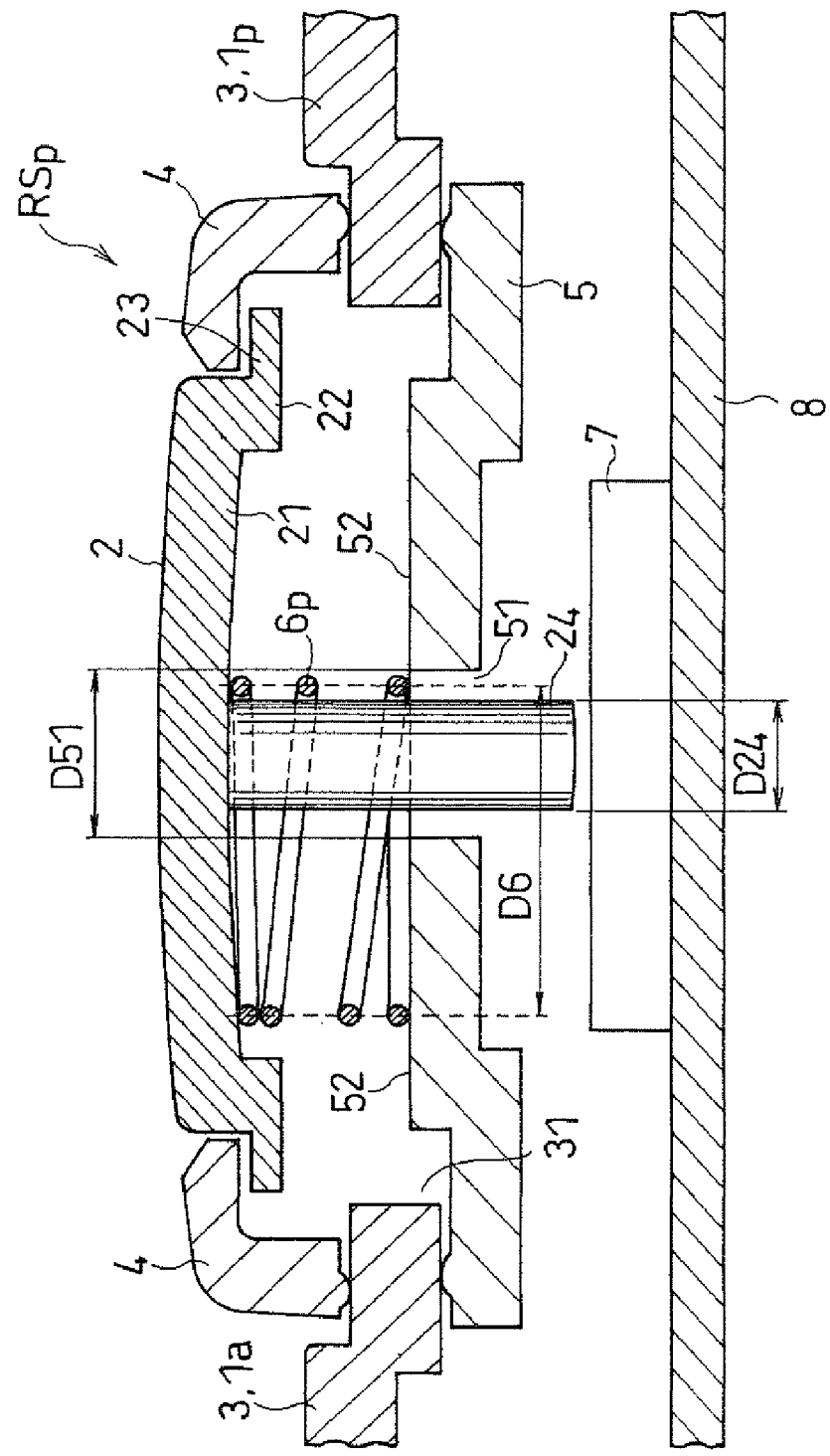

FIG. 10 illustrates the coil spring 6d fitted on the boss 24 in the same manner as in FIG. 3. As with the coil spring 6b, the coil spring 6d is more reliably secured to the boss 24 by the two small diameter portions 61c and 61d.

While the third variant has been described with respect to the example where the polygonal small diameter portions 61c and 61d are provided at opposite ends of the large diameter portion 62a, the same effect can also be achieved even if the small diameter portion 61d at one end is replaced by the circular small diameter portion 61b described in the second variant.

In addition, although not shown, by forming the boss 24 such that its cross-sectional shape matches the shape of an opening in the small diameter portion 61a, 61b, 61c, or 61d, the coil spring 6a, 6b, 6c, or 6d is well-fitted on the boss 24 at the time of assembly, making it possible to achieve stable assembly free from wobbling. Furthermore, each of the small diameter portions 61a, 61b, 61c, and 61d is not intended to be limited to an end of the large diameter portion 62a, and may be provided, for example, at a position between opposite ends of the large diameter portion 62a.

Note that the shutter button 2, the boss 24, and the coil spring 6a, 6b, 6c, or 6d in the switch pressing mechanism RS can constitute a switch pressing device for pressing the switch 7. Such a switch pressing device achieves a significant effect of enabling nonconventional smooth pressing as described above. Therefore, electronic equipment provided with the switch pressing device also makes it possible to achieve nonconventional smooth pressing of the switch.

The present invention is widely applicable not only to camera devices with a shutter button biased by a coil spring, but also to electronic equipment with a switch pressing device.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A camera device with a shutter button, the shutter button having an obverse face and a reverse face, for transmitting an externally-applied pressing force to a switch, the device comprising:
   a plate-like member including a flat portion disposed opposite to the reverse face of the shutter button,
   a coil spring disposed between the shutter button and the plate-like member and having a first winding portion and a second winding portion, the first winding portion being wound into a first shape about a central axis, the second winding portion being wound into a second shape about the central axis so as to include the first winding portion, and
   a boss portion provided on the reverse face of the shutter button, opposed to the switch, and inserted into the first winding portion and the second winding portion, wherein:
   the flat portion of the plate-like member includes a hole for inserting the boss portion therein, the boss portion pushes the switch by way of the externally-applied pressing force transmitted through the shutter button in condition of being inserted in the hole of the flat portion, the first winding portion is provided so as to continue from one end of the second winding portion, the first winding portion and a winding of the second winding portion that continues therefrom are positioned roughly on a same plane at an end of the coil spring, ends of the second winding portion are in contact with the shutter button and the flat portion, respectively, the second winding portion has a larger diameter about the central axis than the first winding portion, the first winding portion is positioned proximal to the shutter button, and the second winding portion has substantially the same diameter along its entire length, and its length is substantially equal to that of the coil spring.

2. The camera device according to claim 1, wherein the first and second shapes are circular.

3. The camera device according to claim 1, wherein the first shape is polygonal, and the second shape is circular.

4. The camera device according to claim 1, wherein the coil spring further includes a third winding portion wound into a third shape about the central axis, the third shape being included in the second winding portion.

5. The camera device according to claim 4, wherein the first and third winding portions are provided so as to continue respectively from two ends of the second winding portion.

6. The camera device according to claim 5, wherein the first, second, and third shapes are circular.

7. The camera device according to claim 5, wherein the first and third shapes are polygonal, and the second shape is circular.

8. The camera device according to claim 5, wherein the first shape is polygonal, and the second and third shapes are circular.

9. The camera device of claim 1, wherein the coil spring contacts only one surface of the shutter button.

10. The camera device of claim 1, wherein:
the coil spring has both large and small diameter portions at each end, and
the coil spring contacts only one surface of each of the shutter button and the plate-like member.

11. A switch pressing device for transmitting an externally-applied pressing force to a switch, the device comprising:
a button for receiving external pressure, the button having an obverse face and a reverse face,
a plate-like member including a flat portion disposed opposite to the reverse face of the button,
a coil spring disposed between the button and the plate-like member and including a first winding portion and a second winding portion, the first winding portion being wound into a first shape about a central axis, the second winding portion being wound into a second shape about the central axis so as to include the first winding portion, and
a boss portion provided on the reverse face of the button, opposed to the switch and inserted into the first winding portion and the second winding portion, wherein:
the flat portion of the plate-like member includes a hole for inserting the boss portion therein,
the boss portion pushes the switch by way of the externally-applied pressing force transmitted through the button in condition of being inserted in the hole of the flat portion,
the first winding portion is provided so as to continue from one end of the second winding portion,
the first winding portion and a winding of the second winding portion that continues therefrom are positioned roughly on a same plane at an end of the coil spring,
ends of the second winding portion are in contact with the button and the flat portion, respectively,
the second winding portion has a larger diameter about the central axis than the first winding portion,
the first winding portion is positioned proximal to the button, and
the second winding portion has substantially the same diameter along its entire length, and its length is substantially equal to that of the coil spring.

12. An electronic device comprising a switch pressing device of claim 11.

13. The switch pressing device of claim 11, wherein the coil spring contacts only one surface of the button.

14. The switch pressing device of claim 11, wherein:
the coil spring has both large and small diameter portions at each end, and
the coil spring contacts only one surface of each of the button and the plate-like member.

\* \* \* \* \*